US012731875B2

(12) United States Patent
Cha

(10) Patent No.: US 12,731,875 B2
(45) Date of Patent: Sep. 8, 2026

(54) BATTERY CELL MANUFACTURING METHOD USING ELECTROLYTIC SOLUTION SATURATED WITH SOLUBLE GAS

(71) Applicant: LG ENERGY SOLUTION, LTD., Seoul (KR)

(72) Inventor: In Young Cha, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 714 days.

(21) Appl. No.: 17/924,595

(22) PCT Filed: Oct. 7, 2021

(86) PCT No.: PCT/KR2021/013745

§ 371 (c)(1),
(2) Date: Nov. 10, 2022

(87) PCT Pub. No.: WO2022/080749

PCT Pub. Date: Apr. 21, 2022

(65) Prior Publication Data

US 2023/0327219 A1 Oct. 12, 2023

(30) Foreign Application Priority Data

Oct. 16, 2020 (KR) ........................ 10-2020-0134686

(51) Int. Cl.
*H01M 50/609* (2021.01)
*H01M 10/04* (2006.01)

(52) U.S. Cl.
CPC ....... *H01M 50/609* (2021.01); *H01M 10/049* (2013.01)

(58) Field of Classification Search
None
See application file for complete search history.

(56) References Cited

U.S. PATENT DOCUMENTS 6,143,449 A 11/2000 Kita et al.
2002/0136947 A1 9/2002 Spillman et al.
2006/0024588 A1 2/2006 Jito et al.
2007/0072062 A1* 3/2007 Fukui .................. H01M 50/528 429/161

(Continued)

FOREIGN PATENT DOCUMENTS

CN 1941492 A 4/2007
CN 103620853 A 3/2014

(Continued)

OTHER PUBLICATIONS

Extended European Search Report for European Application No. 21880396.3, dated Oct. 31, 2024.

(Continued)

*Primary Examiner* — Anca Eoff
*Assistant Examiner* — James A Corno
(74) *Attorney, Agent, or Firm* — Birch, Stewart, Kolasch & Birch, LLP

(57) ABSTRACT

A battery cell manufacturing method includes receiving an electrode assembly in a battery case, preparing an electrolytic solution saturated with a soluble gas, injecting the electrolytic solution into the battery case, and impregnating the electrode assembly with the electrolytic solution.

9 Claims, 4 Drawing Sheets

(56) References Cited

U.S. PATENT DOCUMENTS

| | | | | |
|---|---|---|---|---|
| 2007/0072087 | A1 | 3/2007 | Yamamoto et al. | |
| 2012/0009480 | A1* | 1/2012 | Ohashi .............. | H01M 10/0567 429/300 |
| 2013/0081264 | A1* | 4/2013 | Egusa ................. | H01M 10/058 29/623.5 |
| 2014/0162117 | A1 | 6/2014 | Matsuno et al. | |
| 2015/0263376 | A1* | 9/2015 | Kondo ................ | H01M 50/103 429/94 |

FOREIGN PATENT DOCUMENTS

| | | | |
|---|---|---|---|
| JP | 2002-329502 | A | 11/2002 |
| JP | 2003-86243 | A | 3/2003 |
| JP | 2003-92146 | A | 3/2003 |
| JP | 3425493 | B2 | 7/2003 |
| JP | 2004-39587 | A | 2/2004 |
| JP | 2005-190901 | A | 7/2005 |
| JP | 2007-335181 | A | 12/2007 |
| JP | 2013-77404 | A | 4/2013 |
| JP | 2013-109855 | A | 6/2013 |
| JP | 6014993 | B2 | 10/2016 |
| JP | 2019-145235 | A | 8/2019 |
| KR | 10-0765053 | B1 | 10/2007 |

OTHER PUBLICATIONS

International Search Report for PCT/KR2021/013745 mailed on Jan. 21, 2022.

* cited by examiner

【FIG. 1】
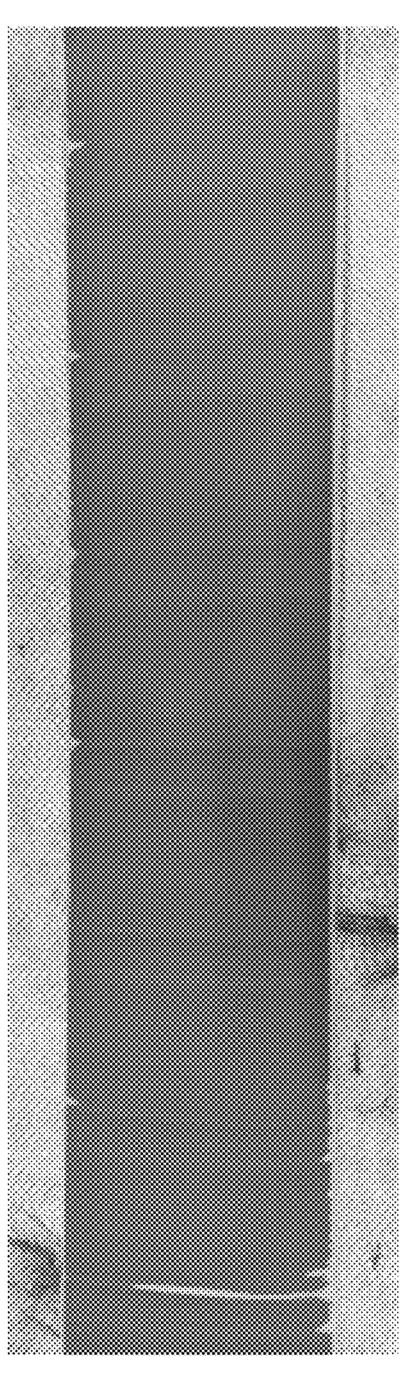

【FIG. 2】
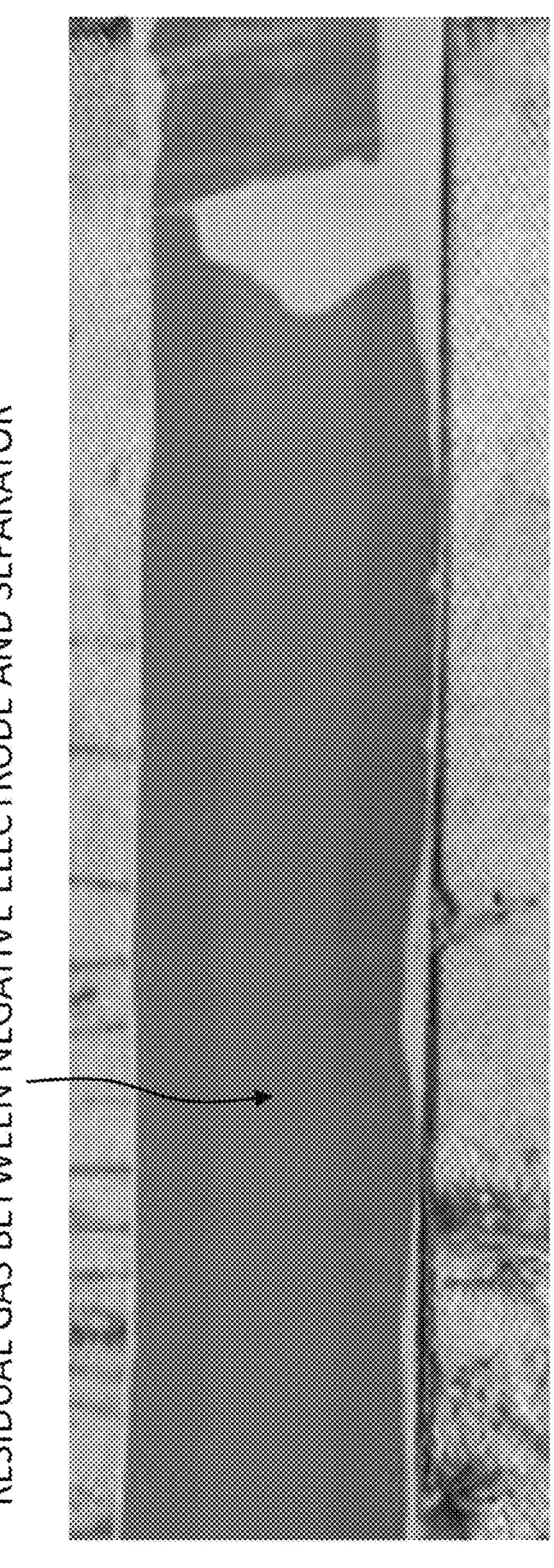

【FIG. 3】
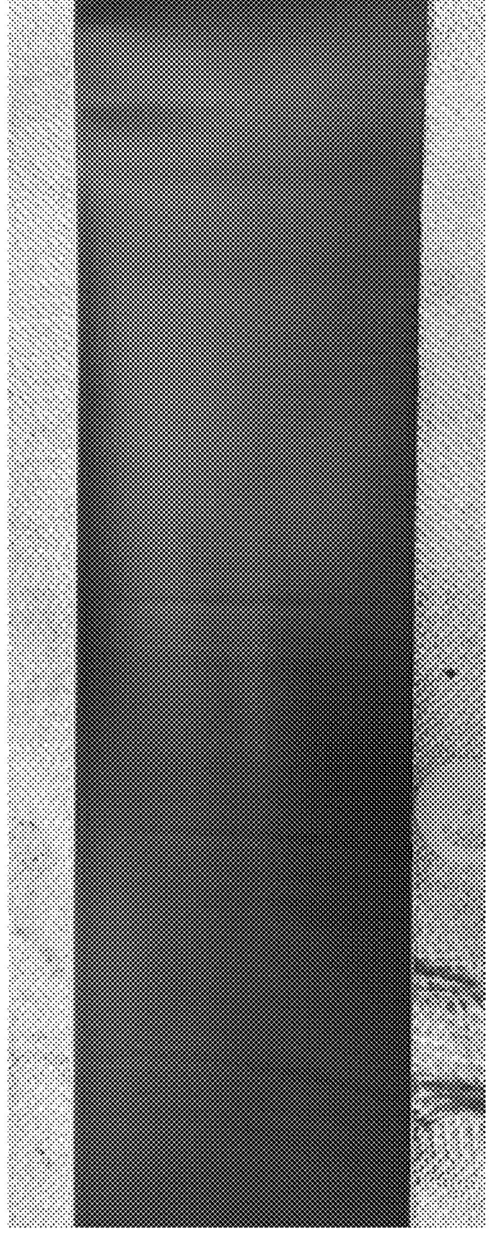

【FIG. 4】
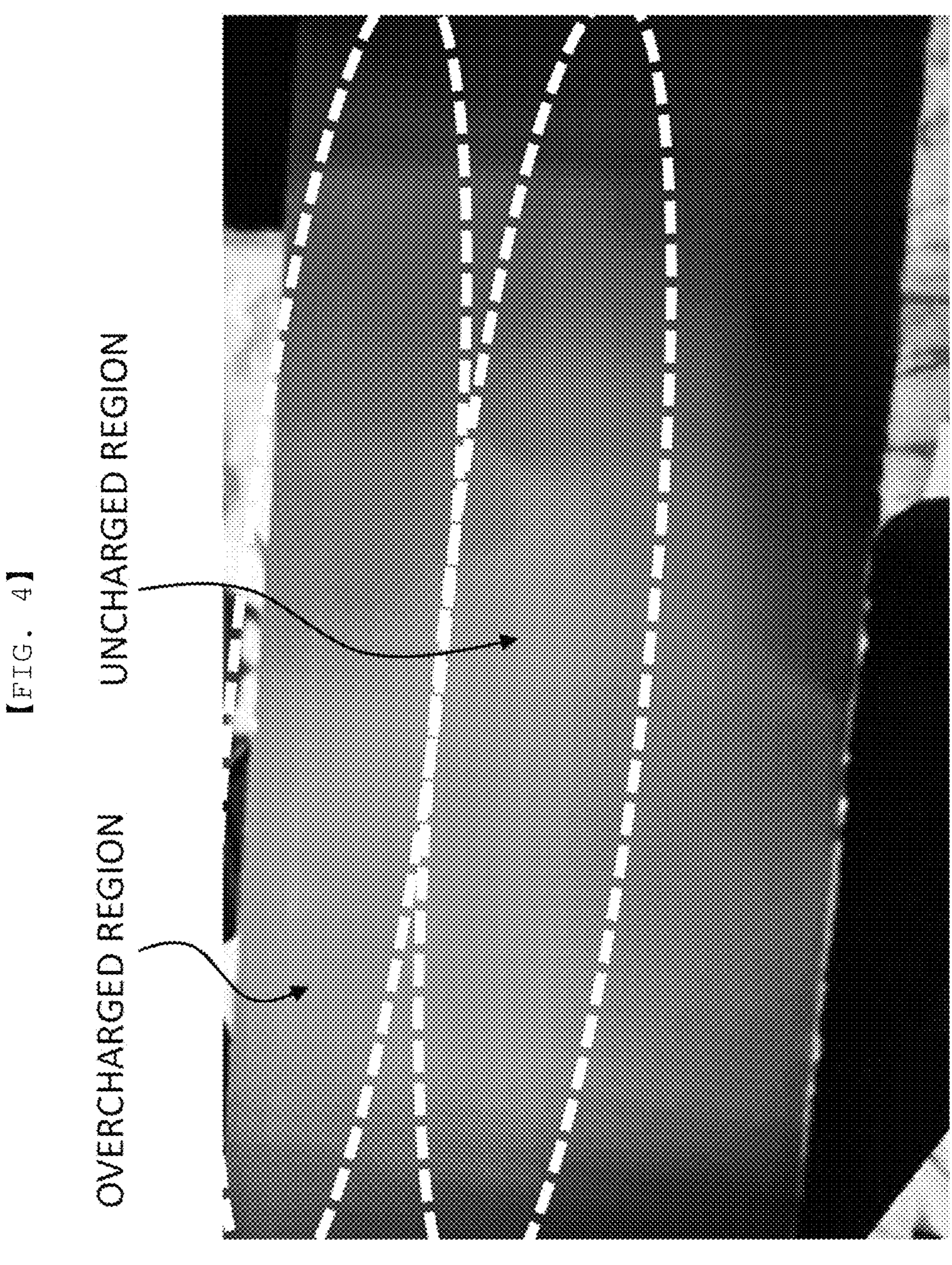

BATTERY CELL MANUFACTURING METHOD USING ELECTROLYTIC SOLUTION SATURATED WITH SOLUBLE GAS

TECHNICAL FIELD

This application claims the benefit of priority to Korean Patent Application No. 2020-0134686 filed on Oct. 16, 2020, the disclosure of which is incorporated herein by reference in its entirety.

The present invention relates to a battery cell manufacturing method using an electrolytic solution saturated with a soluble gas. More particularly, the present invention relates to a battery cell manufacturing method using an electrolytic solution saturated with a soluble gas that is capable of injecting an electrolytic solution saturated with a gas having high electrolytic solution solubility into a battery case having an electrode assembly received therein, whereby it is possible to easily discharge residual gas in the electrode assembly in an electrolytic solution impregnation process.

BACKGROUND ART

With rapid improvement in function of a lithium secondary battery, such as stability improvement and capacity increase, the kinds of devices to which the lithium secondary battery is applied have gradually increased.

For example, the lithium secondary battery has been used as an energy source for wireless mobile devices, which are small multifunctional products, and wearable devices, which are worn on bodies, and has also been used as an energy source for electric vehicles and hybrid electric vehicles presented as alternatives to gasoline and diesel vehicles, which cause air pollution.

The lithium secondary battery has advantages of high energy density and high capacity. Since lithium used as an active material has high reactivity with moisture, however, an electrolytic solution injection process is performed under the atmosphere of air from which moisture has been removed, i.e. dry air, or an inert gas.

When an electrolytic solution injection speed is increased in the electrolytic solution injection process, battery cell manufacturing time may be shortened, and contact between the active material and the electrolytic solution may be improved. Consequently, it is possible to manufacture a battery cell with improved initial charging and discharging characteristics and cycle characteristics.

The lithium secondary battery has a problem in that an organic solvent having high viscosity is used as an ingredient constituting the electrolytic solution, whereby the electrolytic solution does not rapidly permeate into an electrode assembly.

A method of decompressing the interior of a battery case in advance before injecting the electrolytic solution into the battery case, injecting the electrolytic solution into the battery case, and pressurizing the interior of the battery case to replace gas in the battery case with the electrolytic solution was used.

Even though the above method is used, it is difficult to completely discharge residual gas in the electrode assembly from the battery case, and permeation of the electrolytic solution is not rapidly achieved. In addition, the electrolytic solution is not spread due to residual gas between an electrode and a separator, whereby electrolytic solution impregnability is lowered. In the case in which density of an electrode mixture layer is increased in order to increase energy density of the lithium secondary battery, electrolytic solution impregnability may be further lowered.

In the case in which electrolytic solution impregnability is low, as described above, a portion of the electrode assembly may be nonuniformly charged. This causes deviation in capacity between battery cells and shortens the lifespan of the battery cell.

In order to solve such a problem, Patent Document 1 discloses a secondary battery manufacturing method including a process of replacing the interior of a battery case with a gas having an Ostwald solubility coefficient in a non-aqueous electrolytic solution of 2.0 or higher, a process of decompressing the interior of the battery case replaced with the gas, and a process of injecting a non-aqueous electrolytic solution into the decompressed battery case.

Patent Document 2 discloses a non-aqueous electrolytic solution secondary battery manufacturing method including a first process of decompressing the interior of a battery case, a second process of replacing the interior of the battery case with a gas soluble in a non-aqueous electrolytic solution, a third process of injecting the non-aqueous electrolytic solution into the battery case, and a fourth process of removing the gas soluble in the non-aqueous electrolytic solution remaining in the battery case.

Patent Document 1 and Patent Document 2 essentially include the process of injecting the gas soluble in the electrolytic solution into the battery case before injecting the electrolytic solution and the process of decompressing the battery case. However, the battery cell manufacturing process includes several steps, whereby process time and cost are increased. Therefore, there is a high necessity for technology capable of substantially reducing the number of battery cell manufacturing steps while improving electrolytic solution impregnability.

Japanese Patent Application Publication No. 2013-77404 (2013 Apr. 25) ("Patent Document 1")

Japanese Patent Application Publication No. 2007-335181 (2007 Dec. 27) ("Patent Document 2")

DISCLOSURE

Technical Problem

The present invention has been made in view of the above problems, and it is an object of the present invention to provide a battery cell manufacturing method using an electrolytic solution saturated with a soluble gas capable of minimizing the amount of residual gas between an electrode and a separator of an electrode assembly, thereby improving impregnability of the electrode assembly with an electrolytic solution.

Technical Solution

In order to accomplish the above object, a battery cell manufacturing method according to the present invention includes receiving an electrode assembly in a battery case, preparing an electrolytic solution saturated with a soluble gas, injecting the electrolytic solution into the battery case, and impregnating the electrode assembly with the electrolytic solution.

In the battery cell manufacturing method according to the present invention, the soluble gas may be a gas soluble in a non-aqueous electrolytic solution including carbon dioxide.

In the battery cell manufacturing method according to the present invention, the electrode assembly may be a jelly-roll type electrode assembly, a stacked type electrode assembly, a stacked and folded type electrode assembly, or a laminated and stacked type electrode assembly.

In the battery cell manufacturing method according to the present invention, the battery case may be a cylindrical battery case, a prismatic battery case, or a pouch-shaped battery case.

In the battery cell manufacturing method according to the present invention, the impregnating the electrode assembly with the electrolytic solution may include a process of repeatedly decompressing and pressurizing the interior of the battery case.

In the battery cell manufacturing method according to the present invention, in the decompressing the interior of the battery case, gas present in the battery case and the electrode assembly may be discharged from the battery case together with the soluble gas.

In the battery cell manufacturing method according to the present invention, the method may further include purging air from the battery case using nitrogen or carbon dioxide prior to the injecting the electrolytic solution into the battery case.

In the battery cell manufacturing method according to the present invention, the nitrogen may be discharged from the battery case together with the soluble gas during the impregnating the electrode assembly with the electrolytic solution.

In the battery cell manufacturing method according to the present invention, a residual portion of the soluble gas in the battery case may be used as an additive in an initial charging and discharging process of the battery cell.

In the battery cell manufacturing method according to the present invention, the electrolytic solution in the preparing of the electrolytic solution saturated with the soluble gas may be in a state of being saturated with the soluble gas under normal temperature and normal pressure.

In the battery cell manufacturing method according to the present invention, prior to the injecting the electrolytic solution into the battery case, the battery case may be in a vacuum state.

The battery cell manufacturing method according to the present invention may further include hermetically sealing the battery case after the impregnating the electrode assembly with the electrolytic solution.

In the battery cell manufacturing method according to the present invention, the preparing an electrolytic solution saturated with the soluble gas may be performed before the receiving an electrode assembly in the battery case.

In addition, the present invention provides a battery pack including a battery cell manufactured using the battery cell manufacturing method as a unit cell.

Advantageous Effects

As is apparent from the above description, in the case in which a battery cell manufacturing method according to the present invention is used, there is no residual gas between an electrode and a separator of an electrode assembly into which an electrolytic solution is injected, since a gas soluble in the electrolytic solution is used.

In the present invention, a conventional preceding process of performing purging using an inert gas, such as nitrogen, is not necessary, and therefore an assembly process is simple.

In addition, even though the inert gas is injected before injection of the soluble gas, the inert gas is also discharged when the soluble gas is discharged, whereby it is possible to prevent gas that generates air bubbles from remaining between the electrode and the separator of the electrode assembly.

In addition, since an electrolytic solution saturated with a soluble gas is used, a larger amount of the soluble gas is dissolved in the electrolytic solution than in a conventional case in which a soluble gas is directly injected into a battery case and then an electrolytic solution is injected into the battery case. Since a larger amount of the soluble gas is distributed in the electrode assembly, the dissolved soluble gas is evaporated to form flow paths when a decompression and pressurization process is performed in order to improve electrolytic solution impregnability, and therefore it is possible to remove an insoluble gas in the electrode assembly.

As described above, the amount of air bubbles remaining between the electrode and the separator of the electrode assembly is minimized, whereby impregnability of the electrode assembly with the electrolytic solution is improved.

As a result, it is possible to obtain the effects of improvement in cycle characteristics and capacity increase of a battery cell.

Also, in the case in which the battery cell manufacturing method according to the present invention is used, it is possible to simplify a process of manufacturing the battery cell, whereby it is possible to reduce process time and cost.

DESCRIPTION OF DRAWINGS

FIG. 1 is a photograph of a negative electrode having a separator according to Example attached thereto.

FIG. 2 is a photograph of a negative electrode having a separator according to Comparative Example attached thereto.

FIG. 3 is a photograph of a negative electrode according to Example after being charged.

FIG. 4 is a photograph of a negative electrode according to Comparative Example after being charged.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

In addition, a description to embody elements through limitation or addition may be applied to all inventions, unless particularly restricted, and does not limit a specific invention.

Also, in the description of the invention and the claims of the present application, singular forms are intended to include plural forms unless mentioned otherwise.

Also, in the description of the invention and the claims of the present application, "or" includes "and" unless mentioned otherwise. Therefore, "including A or B" means three cases, namely, the case including A, the case including B, and the case including A and B.

Embodiments of the present invention will be described in detail.

A battery cell manufacturing method according to the present invention includes a step of injecting a gas soluble in an electrolytic solution into the electrolytic solution in advance before injecting the electrolytic solution into a battery case. Consequently, a process of replacing gas in the battery case with an inert gas or a gas soluble in the electrolytic solution in advance before the electrolytic solution is injected into a battery case is unnecessary.

Specifically, the battery cell manufacturing method according to the present invention may include (a) a step of receiving an electrode assembly in a battery case, (b) a step of preparing an electrolytic solution saturated with a soluble gas, (c) a step of injecting the electrolytic solution into the battery case, and (d) a step of impregnating the electrode assembly with the electrolytic solution.

The electrode assembly may be at least one selected from the group consisting of a jelly-roll type electrode assembly, which is configured to have a structure in which a positive electrode and a negative electrode are wound in the state in which a separator is interposed therebetween, a stacked type electrode assembly, which is configured to have a structure in which at least one positive electrode and at least one negative electrode are stacked in the state in which a separator is interposed therebetween, a stacked and folded type electrode assembly, which is configured to have a structure in which stacked type unit cells, each of which includes a positive electrode and a negative electrode, are wound using a separation film, and a laminated and stacked type electrode assembly, which is configured to have a structure in which stacked type unit cells, each of which includes a positive electrode and a negative electrode, are stacked in the state in which a separator is interposed therebetween.

The kind of the battery case is not particularly restricted as long as the battery case is hermetically sealed after an electrode assembly and an electrolytic solution are received in the battery case in order to manufacture a battery cell. For example, the battery case may be a can type cylindrical battery case or a can type prismatic battery case made of a metal material. Alternatively, the battery case may be a pouch-shaped battery case made of a laminate sheet including an outer coating layer, a metal barrier layer for moisture and gas blocking, and an inner adhesive layer.

The soluble gas is a gas soluble in a non-aqueous electrolyte, and the kind of the soluble gas is not particularly restricted as long as gas in the electrode assembly can be replaced with the soluble gas or the soluble gas is evaporated to discharge the gas in the electrode assembly from the battery case. For example, the soluble gas may be carbon dioxide.

Step (b) may be performed using a method of putting a nozzle configured to discharge the soluble gas into an electrolytic solution and directly injecting the soluble gas into the electrolytic solution in normal pressure and normal temperature state. Alternatively, the step may be performed using a method of introducing an electrolytic solution into a hermetically sealed container, introducing the soluble gas into the container at higher than normal pressure such that the soluble gas is saturated in the container at higher than normal pressure, and opening the hermetically sealed container such that the pressure in the container is lowered to normal pressure. Meanwhile, step (b) may be performed before step (a), or may be performed simultaneously with step (a).

The saturated state is a state in which the electrolytic solution is saturated with the soluble gas under normal temperature and normal pressure.

Step (d) may include a process of repeatedly decompressing and pressurizing the interior of the battery case, and it is possible to improve impregnability of the electrode assembly with the electrolytic solution through such a process.

For example, the decompression and pressurization process may be performed twice or more. One-time decompression and one-time pressurization may be performed step by step, or first decompression and pressurization and second decompression and pressurization may be different in pressure from each other.

Since the soluble gas is dissolved in the electrolytic solution, the soluble gas may spread to the entire portion of the electrode assembly impregnated with the electrolytic solution. Consequently, the soluble gas may form a large number of gas movement paths in the electrolytic solution as the result of being evaporated. In the decompression process of step (d), gas present in the battery case and the electrode assembly in advance may be discharged from the battery case together with the soluble gas along the gas movement paths.

In a concrete example, in step (a), air present in the battery case and the electrode assembly includes moisture, which easily reacts with lithium, and gas that may chemically react with materials constituting the battery cell, and therefore it is necessary to remove the air. In order to replace the air in the battery case with an inert gas, therefore, a process of purging the air from the battery case using nitrogen or carbon dioxide gas before step (c) may be included.

The nitrogen or carbon dioxide gas injected in order to replace the air in the battery case may be discharged from the battery case together with the soluble gas in step (d).

Meanwhile, for a lithium secondary battery, various additives may be used in order to improve the performance of the battery cell. For example, an SEI film generated as the result of initial reaction may be analyzed using various additives, such as vinyl carbonate (VC), vinyl ethylene carbonate (VEC), and fluoroethylene carbonate (FEC), whereby a change in electrochemical properties may be measured.

In the present invention, an electrolytic solution saturated with carbon dioxide is used. Most carbon dioxide may be discharged from the battery case in step (d), and residual carbon dioxide in the battery case may perform the function of an additive, such as VC or FEC, in an initial charging and discharging process of the battery cell, and may be removed as the result of such chemical reaction.

In a concrete example, in order to improve impregnability of the electrode assembly with the electrolytic solution, the interior of the battery case may be decompressed into a vacuum state before step (c), and then the electrolytic solution may be injected into the battery case.

For example, the decompression process may be performed through a process of reducing pressure step by step.

The battery cell manufacturing method according to the present invention may further include (e) a step of hermetically sealing the battery case after step (d).

In the case in which the battery case is a prismatic battery case, a process of coupling a cap plate to the battery case in order to hermetically seal the battery case may be performed.

In the case in which the battery case is a cylindrical battery case, a process of disposing a cap assembly at the upper part of the battery case and crimping the cap assembly in order to hermetically seal the battery case may be performed.

In the case in which the battery case is a pouch-shaped battery case, a process of disposing outer peripheries of the battery case so as to face each other and applying heat and pressure to the outer peripheries of the battery case in order to hermetically seal the outer peripheries of the battery case in a direction in which the electrolytic solution is injected may be performed.

In addition, the present invention provides a battery pack including a battery cell manufactured using the battery cell manufacturing method as a unit cell.

Hereinafter, the present invention will be described with reference to the following example; however, the example is provided only for easier understanding of the present invention and should not be construed as limiting the category of the present invention.

In order to check impregnability of an electrode assembly with an electrolytic solution, a positive electrode, a negative electrode, and a separator having the following composition were prepared to manufacture an electrode assembly.

95 weight % of $Li(Ni_{0.6}Mn_{0.2}Co_{0.2})O_2$, as a positive electrode active material, 2.0 weight % of Super-P, as a conductive agent, and 3.0 weight % of polyvinylidene fluoride, as a binder, were added to N-methyl-2-pyrrolidone (NMP), as a solvent, to manufacture a positive electrode mixture slurry, and the positive electrode mixture slurry was applied to aluminum foil by coating, dried, and pressed to manufacture a positive electrode.

96 weight % of natural graphite, as a negative electrode active material, 1.0 weight % of Super-P, as a conductive agent, 2.0 weight % of styrene butadiene rubber, as a binder, and 1.0 weight % of carboxymethyl cellulose, as a thickener, were added to $H_2O$, as a solvent, to manufacture a negative electrode mixture slurry, and the negative electrode mixture slurry was applied to aluminum foil by coating, dried, and pressed to manufacture a negative electrode. Here, Super-P is carbon black.

A base member having a porous structure made of polyolefin was prepared, and a coating layer including 80 weight % of $Al_2O_3$, as an inorganic material, and 20 weight % of polyvinylidene fluoride, as a binder, was applied to the base member by coating to manufacture a separator.

The separator, the negative electrode, and the positive electrode were stacked and wound to manufacture a jelly-roll type electrode assembly.

EXAMPLE

The jelly-roll type electrode assembly manufactured as described above was received in a cylindrical battery case.

In order to prepare an electrolytic solution saturated with a soluble gas, a non-aqueous electrolytic solution having 1M of $LiPF_6$ contained in a solvent including ethylene carbonate, dimethyl carbonate, and diethyl carbonate mixed with each other in a ratio of 1:2:1 was prepared.

A nozzle configured to discharge carbon dioxide was put into the non-aqueous electrolytic solution, and carbon dioxide was directly injected into the non-aqueous electrolytic solution under normal temperature and normal pressure to manufacture a non-aqueous electrolytic solution saturated with carbon dioxide.

The non-aqueous electrolytic solution saturated with carbon dioxide was injected into the cylindrical battery case, in which the jelly-roll type electrode assembly was received, and a process of decompressing and pressurizing the interior of the cylindrical battery case was performed.

Comparative Example

The jelly-roll type electrode assembly manufactured as described above was received in a cylindrical battery case.

The interior of the cylindrical battery case was decompressed into a vacuum state, and nitrogen was injected into the cylindrical battery case such that gas in the cylindrical battery case was replaced with nitrogen.

The non-aqueous electrolytic solution described in Example was injected into the cylindrical battery case under normal temperature and normal pressure, and a process of decompressing and pressurizing the interior of the cylindrical battery case was performed.

Experimental Example 1

Electrolytic Solution Impregnability

Each of the jelly-roll type electrode assemblies according to Example and Comparative Example was disassembled to observe the outer surface of the negative electrode coupled to the separator, photographs of which are shown in FIGS. 1 and 2.

FIG. 1 is a photograph of the negative electrode having the separator according to Example attached thereto, and FIG. 2 is a photograph of the negative electrode having the separator according to Comparative Example attached thereto.

FIG. 1 shows a state in which the entire portion of the negative electrode was uniformly impregnated with the electrolytic solution, and it can be seen that there were no air bubbles between the negative electrode and the separator and that the entireties of the negative electrode and the separator were completely attached to each other.

FIG. 2 shows a state in which residual gas was present at the middle part of the interface between the negative electrode and the separator. Consequently, the upper end and the lower end of the negative electrode were wetted by the electrolytic solution, whereas the middle part of the negative electrode was not impregnated with the electrolytic solution.

In the case in which the battery cell manufacturing method according to the present invention is used, therefore, it is possible to manufacture an electrode assembly having high electrolytic solution impregnability.

Experimental Example 2

Charged Region 0.2 C current was applied to the cylindrical battery cells manufactured according to Example and Comparative Example such that the cylindrical battery cells were charged up to SOC 50 in a constant current (CC) charging mode, and then the cylindrical battery cells were disassembled.

The surface of the negative electrode of each of the jelly-roll type electrode assemblies was observed to check the charged region of the negative electrode. The results are shown in FIGS. 3 and 4.

FIG. 3 is a photograph of the negative electrode according to Example after being charged, and FIG. 4 is a photograph of the negative electrode according to Comparative Example after being charged.

It can be seen from FIG. 3 that the entire portion of the negative electrode was uniformly charged. However, it can be seen from FIG. 4 that the portion of the negative electrode corresponding to the portion of the negative electrode of FIG. 2 in which the residual gas was present, i.e. the portion of the negative electrode having low impregnability, was not charged and that the other portion of the negative electrode was overcharged.

In the case in which an electrode that is nonuniformly charged is used, as described above, the lifespan of the battery cell may be reduced.

In the case in which the battery cell manufacturing method according to the present invention is used, therefore, it is possible to simplify a battery cell manufacturing process, whereby it is possible to reduce process time and cost.

Those skilled in the art to which the present invention pertains will appreciate that various applications and modifications are possible within the category of the present invention based on the above description.

INDUSTRIAL APPLICABILITY

The present invention relates to a battery cell manufacturing method including (a) a step of receiving an electrode assembly in a battery case, (b) a step of preparing an electrolytic solution saturated with a soluble gas, (c) a step of injecting the electrolytic solution into the battery case, and (d) a step of impregnating the electrode assembly with the electrolytic solution, and therefore the present invention has industrial applicability.

The invention claimed is:

1. A battery cell manufacturing method comprising:

receiving an electrode assembly in a battery case;

preparing an electrolytic solution saturated with a soluble gas;

after receiving the electrode assembly in the battery case, purging air from the battery case using nitrogen;

after purging air from the battery case, injecting the electrolytic solution into the battery case; and impregnating the electrode assembly with the electrolytic solution, wherein the impregnating the electrode assembly with the electrolytic solution comprises a process of repeatedly decompressing and pressurizing an interior of the battery case, wherein, in the decompressing the interior of the battery case, gas present in the battery case and the electrode assembly is discharged from the battery case together with the soluble gas, wherein the nitrogen is discharged from the battery case together with the soluble gas during the impregnating the electrode assembly with the electrolytic solution, wherein the process of repeatedly decompressing and pressurizing an interior of the battery case comprises a first decompression and pressurization and a second decompression and decompression, wherein the first and second decompression and pressurization, when in the first decompression and the second decompression are performed at different pressures from each other, and wherein a residual portion of the soluble gas in the battery case is used as an additive in an initial charging and discharging process of the battery cell.

2. The battery cell manufacturing method according to claim 1, wherein the soluble gas is a gas soluble in a non-aqueous electrolytic solution comprising carbon dioxide.

3. The battery cell manufacturing method according to claim 1, wherein the electrode assembly is a jelly-roll type electrode assembly, a stacked type electrode assembly, a stacked and folded type electrode assembly, or a laminated and stacked type electrode assembly.

4. The battery cell manufacturing method according to claim 1, wherein the battery case is a cylindrical battery case, a prismatic battery case, or a pouch-shaped battery case.

5. The battery cell manufacturing method according to claim 1, wherein the electrolytic solution in the preparing of the electrolytic solution saturated with the soluble gas is in a state of being saturated with the soluble gas under normal temperature and normal pressure.

6. The battery cell manufacturing method according to claim 1, wherein, prior to the injecting the electrolytic solution into the battery case, the battery case is in a vacuum state.

7. The battery cell manufacturing method according to claim 1, further comprising hermetically sealing the battery case after the impregnating the electrode assembly with the electrolytic solution.

8. The battery cell manufacturing method according to claim 1, wherein the preparing an electrolytic solution saturated with the soluble gas is performed before receiving an electrode assembly in the battery case.

9. A battery pack comprising a battery cell manufactured using the battery cell manufacturing method according to claim 1 as a unit cell.

* * * * *